United States Patent
Hedman

(10) Patent No.: US 10,570,817 B2
(45) Date of Patent: Feb. 25, 2020

(54) METHOD FOR A DIESEL ENGINE AND DIESEL ENGINE

(71) Applicant: HEDMAN, ERICSSON PATENT AB, Flen (SE)

(72) Inventor: Mats Hedman, Sparreholm (SE)

(73) Assignee: HEDMAN, ERICSSON PATENT AB, Flen (SE)

( * ) Notice: Subject to any disclaimer, the term of this patent is extended or adjusted under 35 U.S.C. 154(b) by 0 days.

(21) Appl. No.: 15/766,465

(22) PCT Filed: Oct. 5, 2016

(86) PCT No.: PCT/SE2016/000051
§ 371 (c)(1),
(2) Date: Apr. 6, 2018

(87) PCT Pub. No.: WO2017/061917
PCT Pub. Date: Apr. 13, 2017

(65) Prior Publication Data
US 2018/0306071 A1    Oct. 25, 2018

(30) Foreign Application Priority Data
Oct. 7, 2015   (SE) .................... 1500404-7

(51) Int. Cl.
*F02B 75/04*    (2006.01)
*F02D 15/04*    (2006.01)
(Continued)

(52) U.S. Cl.
CPC ........ *F02B 75/042* (2013.01); *F01L 13/0036* (2013.01); *F02B 3/12* (2013.01);
(Continued)

(58) Field of Classification Search
CPC ....... F01L 13/0036; F02B 3/12; F02B 75/042; F02B 19/06; F02D 15/04; F02D 13/0253; F02D 13/0269; F02D 41/182; F01B 31/14
(Continued)

(56) References Cited

U.S. PATENT DOCUMENTS 4,190,024 A * 2/1980 Davis ................. F02B 1/12
                                        123/48 A
4,240,392 A  12/1980 Matayoshi et al.
(Continued)

FOREIGN PATENT DOCUMENTS

DE    2937619 A1    4/1981
EP    2336521 A1    6/2011
(Continued)

OTHER PUBLICATIONS

International Search Report, dated Jan. 16, 2017, from corresponding PCT application No. PCT/SE2016/000051.
Extended European Search Report for Application No. 16853984.9 dated Mar. 28, 2019.

*Primary Examiner* — Mahmoud Gimie
(74) *Attorney, Agent, or Firm* — Young & Thompson

(57) ABSTRACT

Disclosed is a procedure to minimize NOx during varying engine loads in a 4-stroke diesel engine including at least one cylinder with a cylinder head, first piston on a connecting rod, one actuator mounted on the cylinder head and one of the actuator operated second piston lockable via a hydraulic circuit in various positions in a combustion chamber. The second piston, at the latest during the current compression stroke is actuated by the actuator and locked in the combustion chamber, where it by the first piston introduced air is compressed in a predetermined compression ratio to meet an existing engine load wherein the free operated inlet valve is brought to close the inlet stroke at a piston position where the volume of the combustion air as introduced at the end of (Continued)

the compression stroke gives the predetermined compression ratio and that the injector injects the stated amount of fuel.

6 Claims, 3 Drawing Sheets

(51) Int. Cl.
  *F02B 19/06*  (2006.01)
  *F01L 13/00*  (2006.01)
  *F02B 3/12*  (2006.01)
  *F02D 13/02*  (2006.01)
  *F01B 31/14*  (2006.01)
  *F02D 41/18*  (2006.01)

(52) U.S. Cl.
  CPC .............. *F02B 19/06* (2013.01); *F02D 15/04* (2013.01); *F01B 31/14* (2013.01); *F02D 13/0253* (2013.01); *F02D 13/0269* (2013.01); *F02D 41/182* (2013.01)

(58) Field of Classification Search
  USPC .......................... 123/254, 279, 48 A, 48 AA
  See application file for complete search history.

(56) References Cited

U.S. PATENT DOCUMENTS

| | | | |
|---|---|---|---|
| 5,188,066 A * | 2/1993 | Gustavsson | F02B 41/00 123/48 A |
| 6,427,643 B1 * | 8/2002 | Dixon | F02B 19/06 123/48 A |
| 6,578,533 B1 * | 6/2003 | Gray, Jr. | F02B 1/12 123/48 D |
| 8,973,541 B2 | 3/2015 | Hedman | |
| 2003/0097998 A1 | 5/2003 | Gray, Jr. | |
| 2005/0284444 A1 | 12/2005 | Sherman | |
| 2007/0256658 A1 * | 11/2007 | Andersson | F01B 31/14 123/193.5 |

FOREIGN PATENT DOCUMENTS

| | | | |
|---|---|---|---|
| FR | 2440471 A1 | 5/1980 | |
| JP | 2005-220849 A | 8/2005 | |
| SE | 504359 C2 | 1/1997 | |
| SE | 1100435 A1 | 12/2012 | |
| SE | 535886 C2 | 2/2013 | |
| WO | WO-0009871 A1 * | 2/2000 | ............... F02B 1/12 |
| WO | 2004/042216 | 5/2004 | |
| WO | 2012/166035 A1 | 12/2012 | |

* cited by examiner

METHOD FOR A DIESEL ENGINE AND DIESEL ENGINE

TECHNICAL AREA

The invention relates to diesel engines where emissions in the form of nitrogen oxides (NOx) represent a large problem.

An ordinary 4-stroke diesel engine with so-called qualitative combustion causes high NOx formation.

BACKGROUND

In an internal combustion engine a piston moves between two positions, an upper and a lower turning point. An inlet stroke is followed by a compression stroke that is followed by a work stroke which in turn is followed by an exhaust stroke ending the procedure, so to say a standard 4-stroke procedure. In an ordinary diesel engine the inlet and outlet valves open with the aid of a camshaft. Further the ratio between the cylinder volume and the combustion chamber volume, the compression ratio, is constant e.g. 16:1 or 17:1 or otherwise. The high compression ratio causes a high efficiency.

A problem to be solved in the current diesel engines is to reduce NOx which is the result of a mixture of oxygen and nitrogen in air and is increasing rapidly with raising combustion temperatures. Combustion at high temperatures reduces both the HC and CO as well as the creation of particles and contributes to a reduction in fuel consumption. On the other hand, there is increase in NOx which is unwanted because of the health risks associated with inhaling, particularly in city traffic.

It is known that the NOx is produced at high temperatures and during lean conditions, i.e. little fuel and much air, so-called air surplus.

Diesel engines use the so-called qualitative combustion which means that in principle the same volume of air is compressed cycle after cycle and the varying needs of power is provided by injecting varying amounts of fuel. As a result of this the often more or less lean conditions occur with more or less air excess, which leads to the formation of more or less NOx. Qualitative combustion thus forms the different amounts of NOx in the combustion gases depending on the current engine load and this is precisely what makes it difficult to find a method to continuously reduce NOx. The problem can be summarized to that qualitative combustion leads to varying air excess and the accompanying formation of NOx which today often tries to be reduced by the so-called EGR (EXHAUST GAS RECIRCULATION) recirculation of the cooled exhaust gases to the inlet.

THE PURPOSE OF THE INVENTION

The main object of the invention is to achieve a diesel engine which at all engine loads has high efficiency and at the same time generates significantly less NOx compared to the existing diesel engines.

This object is obtained by the invention which has been given the characterizing clauses mentioned in the claims below.

Through a combustion in which quantities of fuel at the variation of engine loads is continually average adapted to the amount of the air—so called quantitative combustion—will give each compression ratio, cycle after cycle, the same effective compression ratio. This minimizes NOx at the same time with the attainment of a high engine efficiency at all engine loads.

DESCRIPTION OF THE INVENTION

The solution of the problem and the core of the invention: The compressed air can continuously, cycle after cycle during varying engine loads be adapted to the amount of fuel that produces the minimum amount of NOx in the combustion gases. This is done that for each engine load a selected volume of air is compressed to essentially the same end pressure cycle after cycle. This is made possible by the combustion chamber, wherein the air is compressed, is varied via the engine control system in relation to said selected volume of air depending on the demand of the power/engine load and which is loaded through the free operated valves during the intake stroke and which are kept open at a time selected by the engine control system. After the compression the amount of fuel is injected that produces the minimum of NOx. The mass of the fuel, which provide minimum NOx in relation to the mass of the compressed air, will according to the invention in principle be equal cycle after cycle independent of the current engine load. The remaining percentage of NOx in the exhaust gases becomes continuous substantially the same which facilitates the possible need to find the appropriate method for any after treatment.

With free operated valves in the cylinder head, poppet valves as in modern 4-stroke engines, and variable compression volume the problems of NOx may be greatly reduced. This by avoiding the above mentioned lean conditions. The camshaft of to-day to control the outlet valves can be maintained but the inlet valves should be freely operated just for the best operating economy regulating the amount of inlet air. If also the inlet valves are operated as today by the camshaft the amount of inlet air must be regulated with any type of air restrictor which however would not exploit the full potential to truly high efficiency.

Free pneumatically operated valves which is preferred, open with pressurized gas, preferably air. The air is compressed by a compressor to a pressure that is customized to stable open valves (see patent SE535886 C2, SE110 0435 (A1). But also other methods for free operated valves, such as hydraulic or electromagnetic operated valves, can be used. Variable compression can be achieved in different ways. This advocates a method where the current space in the piston, the so-called piston cavity, can be said to be transferred to the cylinder head and is referred to as the combustion chamber whose volume is variable e.g. according to the principle of the above mentioned patents. This is illustrated below in connection with the description of the preferred embodiment.

Thus the object of the invention is as mentioned above to achieve a diesel engine which at all engine loads/power has high efficiency and at the same time generates tangible less NOx than diesel engines of today.

Via control of the inlet valve opening times in relation to the volume of the combustion chamber in the cylinder head, or different expressed, by controlling the volume of the combustion chamber in relation to the opening time of the inlet valves, the decided compression ratio for the said engine can be maintained at different engine loads at the same time as the mass of the injected fuel to be adapted and directed toward the minimization of NOx, i.e. said lean conditions is avoided. This gives simultaneously a high combustion pressure, high combustion temperatures and high efficiency. If the volume of the combustion chamber shall be amended to adapt to a new engine load this may, optimal for minimizing the NOx, take place at the latest during the compression stroke following the last amended opening time for inlet valves during the previous inlet stroke but alternatively during the previous exhaust stroke. The conversion from partial to maximum engine load can advantageously be made under combustion strokes when there is high pressure in the cylinder.

If for a given cylinder volume the compression ratio is e.g. 16:1 and the inlet valves have in principle been open for the entire intake stroke, and the mass of the injected fuel in the combustion chamber is adapted for minimizing NOx. If then for lowering the engine power, half as much combustion air during intake stroke through the inlet valves of the engine control system is ordered to close earlier, in principle halfway during the intake stroke for burning compartment volume in the cylinder head must be reduced as much, in principle be halved, so that the compression ratio is maintained in principle, when half as much fuel is to be implemented. The result is high combustion temperature, high combustion pressure and also a markedly increased efficiency by work stroke that will be longer than the inlet stroke, a so-called Miller Cycle. A 50% reduction of the size of the combustion chamber can be made during one or a few individual cycles. The size of the combustion chamber which are constantly adjusted against decided compression ratio is smallest at idle speed and greatest at maximum engine load which may include the charge-back via e.g. a exhaust turbine. Alternatively, it may at low load e.g. idle be possible to alternate with so-called cylinder shut-off, wherein not shut-off cylinders is operated to deliver more power to keep the engine running.

Even if control of the inlet valves provides a good precision for the supply of, by the engine control system adopted mass of air a so-called air mass gauge can advantageously be used to safely reach the amount of air and to calculate the mass of fuel to be injected into the combustion chamber on the basis of this.

BRIEF DESCRIPTION OF THE SEVERAL VIEWS OF THE DRAWINGS

The invention will now be described in connection to the attached drawings showing preferred examples where FIG. 2 is schematically a cross section of the upper part of an engine cylinder with the piston in its upper stroke mode at maximum load and in which

FIG. 1 is schematically a cross section of the upper part of an engine cylinder with cylinder head where the combustion chamber volume is adapted for small engine load and with the engine piston at its upper stroke mode after a compression stroke. In principle all the air that has been loaded under the inlet stroke is locked in said volume.

FIG. 2 is schematically a cross section of the upper part of an engine cylinder with cylinder head where the combustion chamber volume is adapted for maximum engine load and the engine piston is in its upper stroke mode after a compression stroke. In principal all the air from the inlet stroke is locked in the above mentioned volume.

FIG. 3 is schematically a cross section of the upper part of an engine cylinder with cylinder head where the combustion chamber volume is suitable for medium sized engine load and the engine piston in its upper stroke mode after a compression stroke. In principal all the air from the intake stroke is locked in the above mentioned volume.

Figure 1:
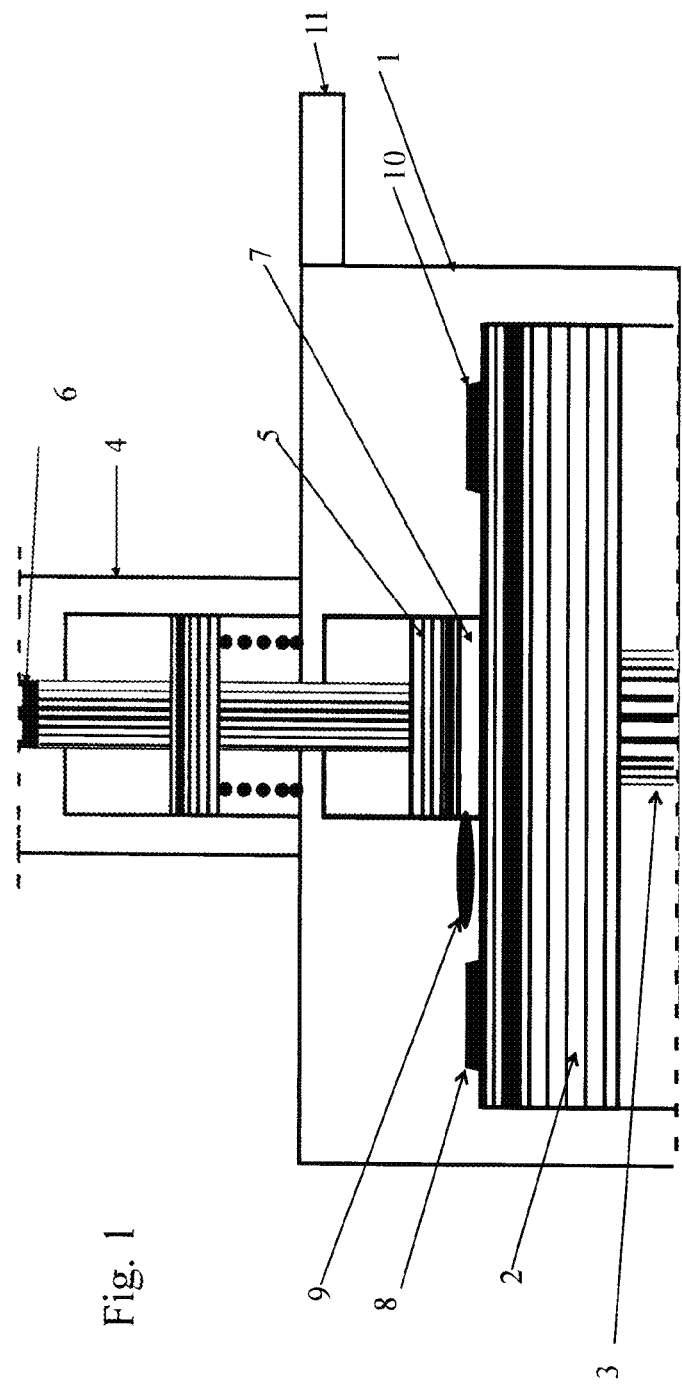
FIG. 1 is schematically a cross section of the upper part of an engine cylinder with the piston in its upper stroke mode at low load.

An engine cylinder with cylinder head 1 with a piston 2 mounted on a connecting rod 3 is shown in FIG. 1. An actuator 4, in principle the execution of patents (SE535886 C2, SE110 0435 (A1). The engine valve according to the above mentioned patent has been replaced with a piston 5 which is displaceable in a combustion chamber 7. The piston 5 can, via the signal from the engine control system, not shown here, be controlled to adopt different positions in the combustion chamber and thus vary the volume of the part below the piston wherein a substantial part of the combustion takes place when the fuel is injected through the injector 9. The different modes is locked by a hydraulic circuit 6 described in said patent. An outlet valve 8 is controlled by a camshaft or by an actuator as e.g. in said patent shown symbolically as well as an inlet valve 10 which advantageously, but not necessarily, is opened and closed by an actuator on the signal from the engine control system with a function in accordance with the aforementioned patents. An air mass meter 11 is arranged for the measurement of the amount of air supply at inlet stroke via inlet valve 10. Piston 2 shown in its upper stroke mode where it must not be allowed to reach a mechanical contact with the cylinder lock including the poppet valves 8, 10.

Figure 2:
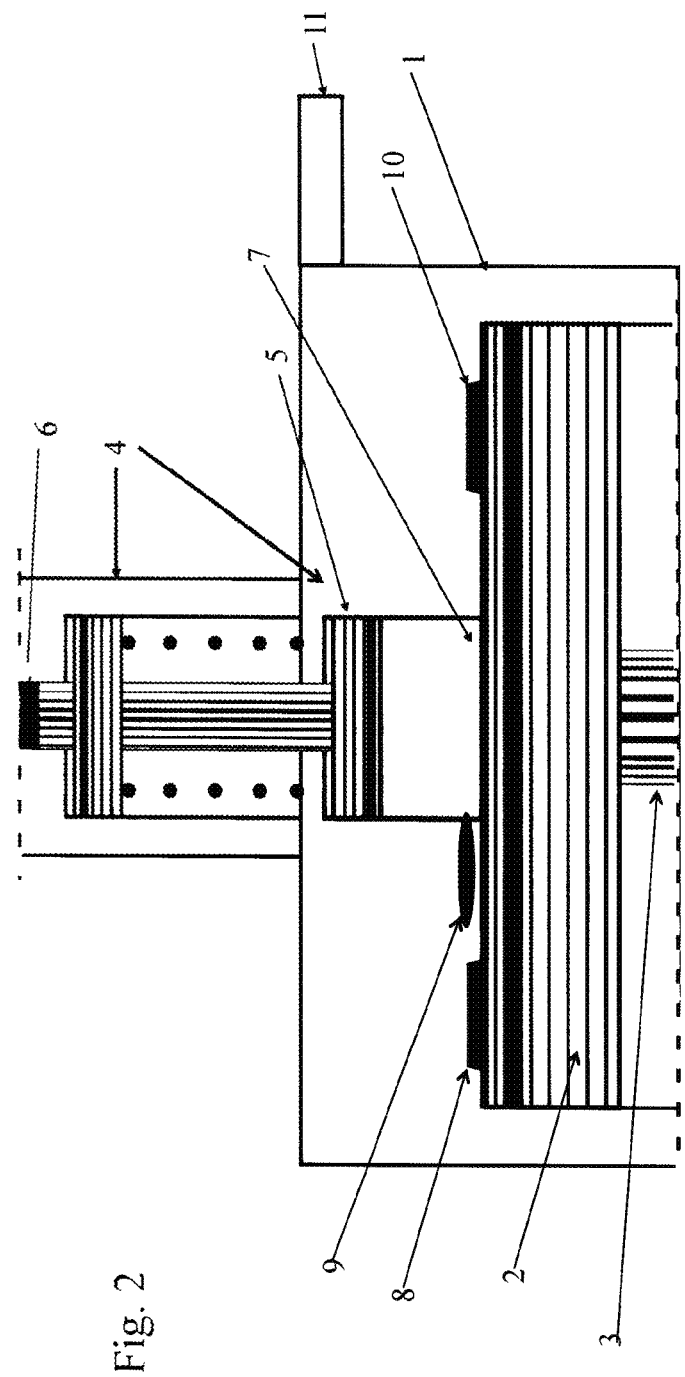

FIG. 2 shows the piston 5 in its upper position where the combustion chamber is at its maximum and the engine can, but need not necessarily, be loaded to the maximum. Still as today more or less engine load can be charged depending on how much fuel is injected, in this case with the higher exhaust emissions of to-day. However it may be advantageous with a small recess in the piston where the piston cavity is located, i.e. in the middle of the combustion chamber.

Figure 3:
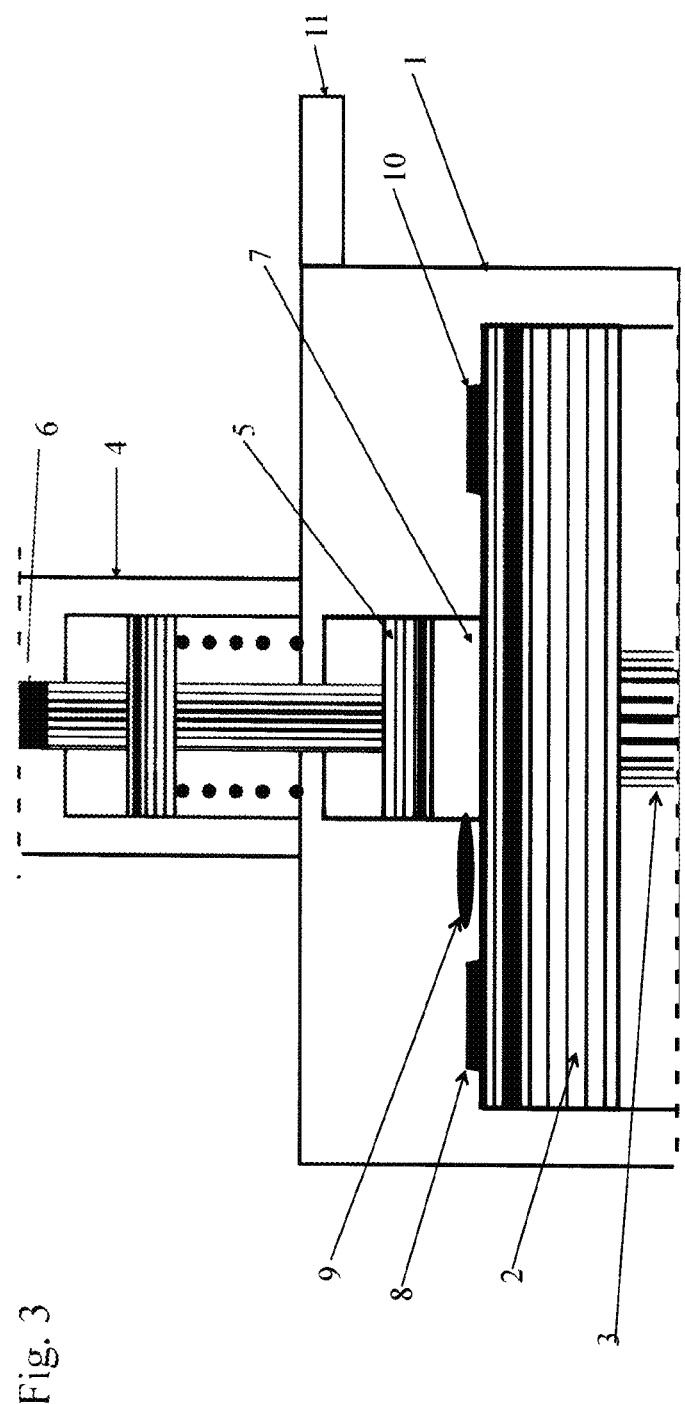
FIG. 3 is schematically a cross section of the upper part of an engine cylinder with the piston in its upper stroke mode at medium load.

FIG. 3 is schematically a cross section of the upper part of an engine cylinder with a cylinder head where the combustion chamber volume is suitable for medium sized engine load and the engine piston in its upper stroke mode after a compression stroke. Basically all the air from the intake stroke is locked in the above mentioned volume. An interesting drive mode is when e.g. a vehicle driver suddenly presses the accelerator pedal to the bottom and thus calls for maximum engine power. During the subsequent expansion stroke the hydraulic circuit 6 locking the piston 5 in the combustion chamber 7 deactivates wherein the plunger in a few ms moves to the upper position in FIG. 2 and at the same time will the free operated inlet valve 5 at the following inlet stroke be kept open for maximum supply of air. At the compression end the appropriate amount of fuel is injected to minimize NOx. The said activities are operated by the engine control system.

It should be noted that a computer-based engine control system of today is obvious and therefore need not be mentioned here how to achieve the opening and closing of the free valves and the piston 5 positioning in the combustion chamber 7 and that the injection of fuel via the injection selector switch 9 commanded by the engine control system which is also connected to the necessary sensors and sonds.

It should be said that combustion will not fully take place in the combustion chamber, as corresponding the current piston cavity with the difference that the size of it can be varied depending on how much air is introduced in the inlet stroke. The combustion ceases after the piston 2 leaves its upper stroke mode and the pressure of the expanding combustion gases acts over the entire piston surface. The said variety and inlet valve opening time under inlet stroke decided by an engine control system which is presumed to exist without being shown in the figures or otherwise being detailed mentioned.

The invention claimed is:

1. A Method to minimize NOx during varying engine loads in a 4-stroke diesel engine, said engine comprising:
   at least one cylinder with a cylinder head,
   a reciprocating first piston mounted on a connecting rod,
   an actuator mounted on the cylinder-head, and
   a second piston operated by the actuator, said second piston being configured to be locked via a hydraulic circuit in various positions in a combustion chamber,
   wherein the cylinder head is provided with at least one outlet valve for exhaust gas evacuation, and at least one freely controllable inlet valve for the supply of combustion air,
   wherein at least one injector is connected to the combustion chamber for injection of fuel in said chamber,
   said method comprising:
   actuating the second piston, at the latest during the current compression stroke using the actuator, and locking the second piston using the hydraulic circuit at a position in the combustion chamber such that combustion air introduced by the piston is compressed at a predetermined compression ratio to meet a desired engine load;
   ending the inlet stroke by closing the freely controllable inlet valve at a piston position where a volume of the combustion air as introduced at the end of the compression stroke gives the predetermined compression ratio; and
   injecting an amount of fuel using the injector, the amount of fuel corresponding to the desired engine load.

2. The method according to claim 1, wherein the amount of fuel is calculated based on measured values of an air mass meter.

3. The method according to claim 1, wherein the actuating comprises actuating the second piston to move to a changed position in the combustion chamber at the latest during the compression stroke following a changed opening time for the at least one inlet valve during the preceding inlet stroke.

4. The method according to claim 1, wherein the actuating comprises actuating the second piston to move to a changed position in the combustion chamber not later than during the preceding exhaust stroke.

5. The method according to claim 1, further comprising changing the engine load from partial to maximum engine load during work strokes.

6. A 4-stroke diesel engine comprising:
   at least one cylinder with a cylinder head,
   a reciprocating first piston mounted on a connecting rod,
   an actuator mounted on the cylinder head,
   a second piston operated by the actuator, said second piston being configured to be locked by a hydraulic circuit in various positions in a combustion chamber,
   wherein the cylinder head is provided with at least one outlet valve for evacuation of exhaust gases and at least one freely controllable inlet valve for introducing combustion air,
   wherein at least one injector is connected to the combustion chamber for injection of fuel into the chamber,
   wherein the diesel engine further comprises an engine control system configured to:
   control the actuator to displace the second piston, and control the hydraulic circuit to lock the second piston at a position in the combustion chamber such that combustion air introduced by the piston is compressed at a predetermined compression ratio to meet a desired engine load;
   control the freely controllable inlet valve to close during the inlet stroke at a piston position where the volume of the combustion air which has been introduced and which at the end of the compression stroke gives the predetermined compression ratio, and
   control the injector to inject an amount of fuel which corresponds to the desired engine load.

* * * * *

UNITED STATES PATENT AND TRADEMARK OFFICE
CERTIFICATE OF CORRECTION

PATENT NO. : 10,570,817 B2
APPLICATION NO. : 15/766465
DATED : February 25, 2020
INVENTOR(S) : Mats Hedman It is certified that error appears in the above-identified patent and that said Letters Patent is hereby corrected as shown below:

On the Title Page

Left Column:
"(71) Applicant: HEDMAN, ERICSSON PATENT AB, Flen (SE)"
Should be replaced with:
-- (71) Applicant: HEDMAN ERICSSON PATENT AB, Flen (SE) --.

"(73) Assignee: HEDMAN, ERICSSON PATENT AB, Flen (SE)"
Should be replaced with:
-- (73) Assignee: HEDMAN ERICSSON PATENT AB, Flen (SE) --.

Signed and Sealed this
Fourteenth Day of July, 2020

Andrei Iancu
*Director of the United States Patent and Trademark Office*